US006586588B1

(12) United States Patent
Cimecioglu et al.

(10) Patent No.: US 6,586,588 B1
(45) Date of Patent: Jul. 1, 2003

(54) POLYSACCHARIDE ALDEHYDES PREPARED BY OXIDATION METHOD AND USED AS STRENGTH ADDITIVES IN PAPERMAKING

(75) Inventors: A. Levent Cimecioglu, Princeton, NJ (US); John S. Thomaides, Berkeley Heights, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/636,069

(22) Filed: Aug. 10, 2000

Related U.S. Application Data

(63) Continuation-in-part of application No. 09/375,931, filed on Aug. 17, 1999.

(51) Int. Cl.[7] .......................... C08B 31/00; C08B 35/00; C08B 31/18; C08B 37/00; C08B 1/00
(52) U.S. Cl. ...................... 536/104; 536/102; 536/105; 536/121; 536/123; 536/123.1; 536/124; 536/1.11; 536/56; 536/114
(58) Field of Search .............................. 536/123.1, 123, 536/124, 121, 102, 104, 105, 114, 56, 1.11

(56) References Cited

U.S. PATENT DOCUMENTS

| 2,813,093 A | * | 11/1957 | Caldwell et al. | |
| 3,062,652 A | | 11/1962 | Jeffreys et al. | 96/99 |
| 3,086,969 A | | 4/1963 | Slager | 260/209 |
| 3,553,193 A | | 1/1971 | Leroy et al. | 269/233.3 |
| 3,632,802 A | | 1/1972 | BeMiller et al. | 260/233.3 R |
| 4,663,448 A | | 5/1987 | Chiu | 536/111 |
| 4,675,394 A | | 6/1987 | Solarek et al. | 536/43 |
| 4,780,339 A | | 10/1988 | Lacourse et al. | 427/389.7 |
| 5,334,756 A | | 8/1994 | Likibi et al. | 562/565 |
| 5,504,246 A | | 4/1996 | Libiki et al. | 562/540 |
| 5,698,688 A | | 12/1997 | Smith et al. | 536/56 |
| 6,087,135 A | | 7/2000 | Kierulff | 435/101 |

| 2001/0034442 A1 | 10/2001 | Bragd et al. | 536/102 |

FOREIGN PATENT DOCUMENTS

| DE | 19746805 | * | 4/1999 | |
| WO | WO 95/07303 | * | 3/1995 | |
| WO | WO 96/38484 | | 12/1996 | C08B/31/18 |
| WO | WO 99/23117 | | 5/1999 | C08B/15/04 |
| WO | WO 99/23240 | | 5/1999 | C12P/19/04 |
| WO | WO 00/50388 | | 8/2000 | C07C/239/08 |
| WO | WO 00/50462 | | 8/2000 | C08B/15/02 |
| WO | WO 00/50463 | | 8/2000 | C08B/15/02 |
| WO | WO 00/50621 | | 8/2000 | C12P/1/00 |
| WO | WO 01/83887 A1 | | 11/2001 | |

OTHER PUBLICATIONS

J. Bobbitt et al., "Organic Nitrosonium Salts as Oxidants in Organic Chemistry", *Heterocycles*, vol. 27, No. 2, 1988, pp. 509–533.

A. de Nooy et al., "Selective Oxidation of Primary Alcohols Mediated by Nitroxyl Radical in Aqueous solution. Kinetics and Mechanism", *Tetrahedron*, vol. 51, No. 29, 1995, pp. 8023–8032.

P. Chang et al., "Oxidation of Primary Alcohol Groups of Naturally Ocurring Polysaccharides with 2,2,6, 6–Tetramethyl–1–Piperiding Oxoammonium Ion", *J. Carbohydrate Chemistry*, 15(7), 1996, pp. 819–830.

Takuya Kitaoka, Akira Isogai, Fumihiko Onabe, *Nordic Pulp and Paper Research Journal vol. 14 no, Apr. 1999* "Chemical Modification of Pump Fibers by TEMPO–Mediated Oxidation".

* cited by examiner

*Primary Examiner*—James O. Wilson
*Assistant Examiner*—Everett White
(74) *Attorney, Agent, or Firm*—David P. LeCroy, Esq.

(57) ABSTRACT

Polysaccharide aldehydes are prepared using selective oxidation involving the use of nitroxyl radical mediated aqueous oxidation with a limited amount of oxidant and defined reaction conditions. These polysaccharide aldehyde derivatives having maximum effective aldehyde and minimal carboxylic acid levels making them especially useful as wet, temporary wet and dry strength additives for paper.

18 Claims, No Drawings

POLYSACCHARIDE ALDEHYDES PREPARED BY OXIDATION METHOD AND USED AS STRENGTH ADDITIVES IN PAPERMAKING

This application is a continuation in part of application Ser. No. 09/375,931 filed Aug. 17, 1999.

BACKGROUND OF THE INVENTION

This invention relates to the preparation of polysaccharide aldehydes using selective oxidation conditions. More particularly, this invention involves the preparation of polysaccharide aldehyde derivatives using nitroxyl radical mediated aqueous oxidation with a limited amount of oxidant and defined reaction conditions to provide derivatives with maximum effective aldehyde and minimal carboxylic acid content. This invention further involves the use of these selectively prepared polysaccharide aldehydes as strength additives in papermaking.

The term "paper" as used herein, includes sheet-like masses and molded products made from fibrous cellulosic material which may be derived from natural sources, synthetics such as polyamides, polyesters, rayon and polyacrylic resins as well as from mineral fibers such as asbestos and glass. In addition, paper made from combinations of cellulosic and synthetic materials are applicable herein. Paperboard is also included within the broad term "paper".

The preparation of aldehyde containing polysaccharides and the use of such aldehyde derivatives as wet and dry strength additives in the paper industry is well known. Oxidative and non-oxidative methods have been used to introduce aldehyde groups into polysaccharides such as starches, gums and celluloses. Oxidative methods are well known for introducing aldehyde groups into polysaccharides such as starch. These oxidative methods have included: a) treatment of starch with alkali metal bromite or hypobromite under carefully controlled conditions as disclosed in U.S. Pat. No. 3,553,193 issued Jan. 5, 1971 to D. H. Leroy et al.; b) oxidizing a carbohydrate with an alkali metal ferrate as shown in U.S. Pat. No. 3,632,802 issued Jan. 4, 1972 to J. N. BeMiller; c) enzymatically oxidizing hydroxypropyl galactoglycoside starch ethers or ethyl galactoglycoside starch ethers with galactose oxidase as disclosed in U.S. Pat. No. 4,663,448 issued May 5, 1987 to C. W. Chiu; and d) treatment with periodic acid or periodates as disclosed in U.S. Pat. No. 3,096,969 issued to J. E. Slager on Apr. 23, 1963 which shows the preparation of dialdehyde polysaccharide using periodic acid and U.S. Pat. No. 3,062,652 issued on Nov. 6, 1962 to R. A. Jeffreys et al. which shows the preparation of dialdehyde gums using periodate or periodic acid.

Oxidative methods often cause degradation of the polysaccharide and the formation of excess carboxyl groups. Excess carboxyl groups undesirably reduces the degree of aldehyde substitution and negatively affects the cationic/anionic balance of the functional groups when using a cationic polysaccharide base in papermaking applications.

The use of nitroxyl radicals and nitrosonium salts in organic chemistry as an oxidative route to access aldehydes and carboxylic acids from primary and secondary alcohols is disclosed in an article entitled "Organic Nitrosonium Salts As Oxidants in Organic Chemistry" by J. M. Bobbitt and C. L. Flores, in *Heterocycles*, Vol. 27, No. 2, 1988, pp. 509–533. Recently, application of this chemistry was extended to the selective oxidation of primary alcohols in various carbohydrates to carboxylic acids in an article entitled "Selective Oxidation of Primary Alcohols Mediated by Nitroxyl Radical in Aqueous Solution. Kinetics and Mechanism" by A. E. J. de Nooy and A. C. Bessemer, in *Tetrahedron*, Vol. 51, No. 29, 1995, pp. 8023–8032. Patent publication WO 95/07303 dated Mar. 16, 1995 further discloses the use of this technology where carbohydrates having a primary hydroxyl group are oxidized under aqueous conditions to form products having a high content of greater than 90% carboxyl groups. This art involving the oxidation of primary alcohols generally describes the preparation of polyglucuronic acids with high carboxylic acid content. Similarly, the process of oxidation has been used to prepare various polysaccharides with high carboxyl content as described in "Oxidation of Primary Alcohol Groups of Naturally Occurring Polysaccharides with 2,2,6,6-Tetramethyl-1-piperidine Oxoammonium Ion" by P. S. Chang and J. F. Robyt in *J. Carbohydrate Chemistry*, 15(7), 1996, pp. 819–830. It should be noted that in some applications high carboxylic content is undesirable.

A recent patent publication, WO 99/23240 dated May 14, 1999 discloses a method for producing oxidized starch using an oxoammonium ion producing reagent in the presence of an enzyme oxidizing agent. Polysaccharide aldehydes may also be prepared by non-oxidative methods which typically involve the reaction of a polysaccharide with an aldehyde containing reagent. For example, U.S. Pat. No. 4,675,394 issued to D. Solarek et al. on Jun. 23, 1987 discloses a non-oxidative method wherein polysaccharide is reacted with a derivatizing acetal reagent in the presence of alkali to provide the stable acetal polysaccharide. The general disadvantage of these non-oxidative approaches is that they often require an extra conversion step to the aldehyde. For example, the polysaccharide acetals need to be cooked or pre-treated under acidic conditions to form the aldehyde just prior to its use.

What is desired is a direct and selective oxidation route to polysaccharide aldehyde derivatives wherein the aldehydes are formed at maximum effective levels and carboxylic acid levels are minimized making such aldehyde derivatives especially useful as wet, temporary wet and dry strength additives for paper.

SUMMARY OF THE INVENTION

Now it has been found that polysaccharide aldehydes can be selectively prepared under defined oxidation conditions using a nitroxyl radical mediated aqueous oxidation procedure to provide derivatives with maximum effective aldehyde and minimal carboxylic acid content.

More particularly, this invention involves the oxidation of a polysaccharide in an aqueous solution with an oxidant having an equivalent oxidizing power of up to 14.18 g active chlorine per mole of polysaccharide anhydrosugar unit ("ASU") and a mediating amount of nitroxyl radical, the reaction being carried out at a temperature of at or below about 15° C. and a pH of from about 8.0 to 10.5 and the resulting product having up to about 15 mole % of C-6 aldehyde groups per mole of polysaccharide ASU and minimal carboxylic acid content. A polysaccharide ASU is defined to be the monosaccharide residues from which linear or branched polysaccharides can be seen to be constructed by a series of condensation reactions.

The polysaccharide aldehyde derivatives are useful in conventional applications where water-soluble or water-swellable polysaccharide derivatives are useful, for example, as coatings, adhesives and paper additives. The cationic aldehyde containing derivatives are particularly useful as wet, temporary wet and dry strength additives for all paper types including liner board.

DETAILED DESCRIPTION OF THE INVENTION

This invention involves the selective oxidation of polysaccharides in an aqueous system using a limited amount of oxidant with a nitroxyl radical mediator under defined conditions. The prepared products are highly selectively oxidized polysaccharides where there is a high level of C-6 aldehyde functionality with minimal carboxylic acid and are particularly suitable as wet, temporary wet and dry strength paper additives.

When the polysaccharide is starch, the starch base material useful in this invention may be any of several starches, native or modified. Such starches include those derived from any plant source including, corn, potato, sweet potato, wheat, rice, tapioca, waxy maize, sago, sorghum and high amylose starch such as high amylose corn, i.e., starch having at least 45% by weight of amylose content. Starch flours may also be used as a starch source. Also included are the conversion products derived from any of the former bases including, for example, dextrins prepared by the hydrolytic action of acid and/or heat; fluidity or thin-boiling starches prepared by enzyme conversion or mild acid hydrolysis; and derivatized and crosslinked starches.

The starch may be modified with cationic, anionic, amphoteric, zwitterionic, hydrophobic and nonionic groups and combinations of such groups. It is preferred that the starch is modified with a cationic group. Cationization of the starch can be produced by well known chemical reactions with reagents containing groups such as amino, imino, ammonium, sulfonium or phosphonium groups as disclosed, for example in "Cationic Starches" by D. B. Solarek, in *Modified Starches: Properties and Uses*, Chapter 8, 1986 and in U.S. Pat. No. 4,119,487 issued Oct. 10, 1978 to M. Tessler. Such cationic derivatives include those containing nitrogen containing groups comprising primary, secondary, tertiary and quaternary amines and sulfonium and phosphonium groups attached through either ether or ester linkages. Particularly useful cationic starch derivatives are those containing amino or nitrogen groups having alkyl, aryl, alkaryl, aralkyl or cyclic substituents of 1 to 22 carbon atoms and especially 1 to 6 carbon atoms. Preferred derivatives are those containing tertiary amino and quaternary ammonium ether groups.

When the polysaccharide is a gum, the applicable bases which may be used herein include polygalactomannans, which are heteropolysaccharides composed principally of long chains of β-D-mannopyranosyl units to which single unit side chains of α-D-galactopyranosyl units are joined. Also included are degraded gum products, resulting from the hydrolytic action of acid, heat, shear and/or enzyme, oxidized gums, and derivatized gums. The preferred gums include, guar, locust bean, tara and fenugreek gums. Other suitable polysaccharide bases that may be used in this invention include, but not limited to, pullulan, chitin, chitosan, gum arabic, agar, algin, carrageenan, xanthan, gellan, welan, rhamsan, curdlan scleroglucan, tamarind gum, and hemicelluloses such as arabinogalactans and corn fiber gum and their derivatives.

When the polysaccharide is cellulose, applicable bases useful herein include cellulose and cellulose derivatives, especially water soluble cellulose ethers, such as carboxymethylcellulose and alkyl and hydroxyalkylcelluloses, for example, methylcellulose, hydroxypropoylymethylcellulose, hydroxyethylcellulose, hydroxyethylmethylcellulose, hydroxybutylmethycellulose, and ethylhydroxyethylcellulose.

Methods for preparing the modified polysaccharide bases are well known to those skilled in the art and discussed in the literature. See, for example, R. L. Whistler, Methods in Carbohydrate Chemistry, Vol. IV, 1964, pp. 279–311; R. L. Whistler et al, Starch Chemistry and Technology, Vol. 11, 1967, pp. 293–430, R. L. Whistler and J. N. Bemiller (Eds.), Industrial Gums $3^{rd}$ Ed., 1993, Chapter 3, R. L. Davidson and N. Sittig, Water Soluble Resins, $2_{nd}$ Ed., 1968, Chapter 2; and R. L. Davidson, Handbook of Water Soluble Gums and Resins, 1980.

The polysaccharide C-6 aldehydes prepared in accordance with this invention are obtained by a selective oxidation process. This oxidation reaction is carried out in an aqueous system using a limited amount of oxidant with a nitroxyl radical mediator under defined conditions. This defined reaction provides polysaccharide aldehydes where the aldehyde groups remain largely intact without being further oxidized to carboxylic acid residues.

The nitroxyl radical mediator used herein is a di-tertiary alkyl nitroxyl radical having one of the following formulas:

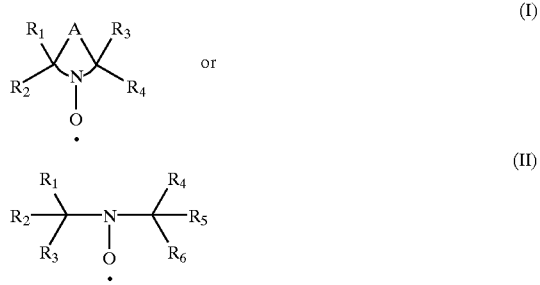

where A represents a chain of preferably two or three atoms, in particular carbon atoms or a combination of one or two carbon atoms with an oxygen or nitrogen atom, and the R groups represent the same or different alkyl groups. Chain A may be substituted by one or more groups such as alkyl, alkoxy, aryl, aryloxy, amino, amido or oxo groups, or by a divalent group or multivalent group which is bound to one or more other groups having formula I. Particularly useful nitroxyl radicals are di-tertiary alkyl nitroxyl radicals having the formula:

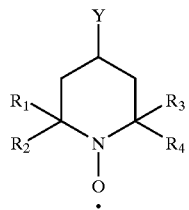

where Y is H, OH or NH—C(O)—CH$_3$ and each of the R groups represent the same or different alkyl groups of 1 to 18 carbon atoms and more particularly methyl groups. Nitroxyl radicals of this type include those where a) the R groups are all methyl (or alkyl of 1 carbon atom) and Y is H, i.e., 2,2,6,6-tetramethyl-1-piperdinyloxy (TEMPO); b) R groups are methyl and Y is OH and identified as 4-hydroxy-TEMPO; and c) R groups are methyl and Y is NH—C(O)—CH$_3$ and identified as 4-acetamido-TEMPO. The preferred nitroxyl radical is TEMPO or 4-acetamido- TEMPO. The nitroxyl radical is used in an effective amount to mediate the oxidation, particularly from about 0.001 to 20 mole %, and more particularly from about 0.01 to 5 mole % based on the moles of polysaccharide ASU. The nitroxyl radical can be added to the reaction mixture or generated in situ from the corresponding hydroxylamine or oxoammonium salts.

The oxidant used in this invention can be any material capable of converting nitroxyl radicals to their corresponding oxoammonium salt. Particularly useful oxidants are the alkali or alkaline-earth metal hypohalite salts such as sodium hypochlorite, lithium hypochlorite, potassium hypochlorite or calcium hypochlorite. An alkali or alkaline-earth metal hypobromite salt may also be used, and it may be added in the form of the hypobromite salt itself, such as sodium hypobromite, or it may be formed in situ from the addition of a suitable oxidant such as sodium hypochlorite and an alkali or alkaline-earth metal bromide salt. Additional oxidants that can be used in this method include hydrogen peroxide in combination with a transition metal catalyst such as methyltrioxorhenium (VII); hydrogen peroxide in combination with an enzyme; oxygen in combination with a transition metal catalyst; oxygen in combination with an enzyme; peroxyacids such as peracetic acid and 3-chloroperoxybenzoic acid; alkali or alkaline-earth metal salts of persulfates such as potassium persulfate and sodium persulfate; alkali or alkaline-earth metal salts of peroxymonosulfates such as potassium peroxymonosulfate; chloramines such as 1,3,5-trichloro-1,3,5-triazine-2,4,6(1H,3H,5H)trione, 1,3-dichloro-1,3,5-triazine-2,4,6(1H,3H,5H) trione sodium salt, 1,3-dichloro-5,5-dimethylhydantoin, 1-bromo-3-chloro-5,5-dimethylhydantoin, and 1-chloro-2,5-pyrrolidinedione; and alkali or alkaline-earth metal salts of ferricyanide. This list of oxidants is only illustrative and is not intended to be exhaustive. The oxidants can be used alone or in combination with an alkali or alkaline-earth metal bromide salt. The preferred oxidant is sodium hypochlorite or sodium hypobromite formed from the addition of sodium hypochlorite and sodium bromide.

The important factor in the use of the oxidant is that it must be used in a limited amount that has the equivalent oxidizing power of up to 14.18 g active chlorine per mole of polysaccharide ASU. More particularly, the amount of oxidant used will have an equivalent oxidizing power of from about 0.35 to 14.18 g of active chlorine and preferably from about 1.77 to 7.09 g active chlorine per mole of polysaccharide ASU. When sodium hypochlorite is used it is added in a limited amount of up to 40 mole percent based on the moles of polysaccharide ASU, more particularly from about 1 to 40 mole percent and preferably from about 5 to 20 mole percent based on the moles of polysaccharide ASU. By limiting the amount of oxidant and controlling its rate of addition under defined aqueous conditions, the polysaccharide C-6 aldehyde derivatives are selectively prepared at effective high levels while minimizing carboxyl formation.

The oxidation reaction may be carried out inan organic, or preferably, aqueous slurry or solution of the polysaccharide. This is accomplished by the slow and controlled addition of the oxidant to the aqueous slurry or solution of the polysaccharide containing a mediating quantity of the nitroxyl radical so as to keep the reaction temperature in the desired temperature range of at or below the maximum temperature of 15° C., particularly 0 to 15° C. and more particularly 5 to 10° C. and the pH is maintained at 8.0 to 10.5 and particularly 9 to 10. The oxidant can be added as the hypochlorite or hypobromite, e.g., sodium hypochlorite or sodium hypobromite, or the hypobromite can be formed in situ by first adding sodium bromide and then adding the sodium hypochlorite solution to generate the hypobromite in situ.

The oxidation may be carried out either in the granular state (slurry reaction) for water insoluble polysaccharides or in the solution state for soluble polysaccharides. The slurry reactions are typically performed at up to 40% solids, i.e., 0.1 to 40% solids, more particularly, 20 to 30%, while homogeneous reactions are carried out at up to 30% solids, i.e., 0.1 to 30% solids and more particularly at 5 to 15% solids.

The importance of carrying out the selective oxidation of polysaccharides under the defined conditions of this invention is that oxidized polysaccharides are produced with high levels of C-6 aldehyde functionality and minimal carboxylic acid formation. These products particularly will have C-6 aldehyde groups in amounts of up to about 15 mole %, and more particularly from about 1 to 15 mole % based on the moles of polysaccharide ASU. Preferably where a slurry reaction is used, the aldehyde content will be up to about 7 mole %, more particularly from about 1 to 7 mole % based on the moles of polysaccharide ASU, whereas when dispersion oxidiation is used, the aldehyde content will be up to about 15 mole % and more particularly from about 1 to 15 mole % based on the moles of polysaccharide ASU. The high or effective levels of aldehyde can be defined by aldehyde to carboxylic acid ratios of greater than or equal to 0.5 (based on the moles of polysaccharide ASU of each functionality) and preferably greater than or equal to 1.0. These aldehyde levels are particularly effective when using the derivatives as paper strength additives. Minimal carboxylic acid levels will typically be from about 0 to 20 mole % based on the moles of polysaccharide ASU.

Novel amphoteric C-6 aldehyde derivatives are produced when cationic polysaccharides are selectively oxidized by the process of this invention. Preferably for paper applications, the amphoteric product will have a net cationic charge. The amount of cationic group can be varied and generally from about 0.5 to 25 mole % and preferably from about 1 to 10 mole % of cationic group based on the moles of polysaccharide ASU will be used. Preferably for paper applications, the amphoteric product will have a net cationic charge Before use in paper applications, slurry oxidized products can be batch or jet-cooked into dispersed liquids. Dispersion generated products, meanwhile, can be used as is. Slurry or dispersion oxidized products can be converted to cold water soluble form, if desired.

The aldehyde derivatives of this invention are useful as wet, temporary wet and dry strength additives in papermaking. The polysaccharide aldehyde derivatives may be used as beater additives, although their addition to the pulp may occur at any point in the papermaking process prior to the ultimate conversion of the wet pulp into a dry web or sheet. Thus, for example, they may be added to the pulp while the latter is in the hydropulper, beater, various stock chests or headbox. The derivative may also be sprayed or applied onto the wet web either as a dispersion or uncooked slurry. It is also envisioned that the aldehyde derivatives of this invention can be applied to the already formed paper sheet by such on machine applications as size press, calender stack or via off machine coating processes.

The aldehyde derivatives may effectively be used for addition to pulp prepared from any type of cellulosic fibers, synthetic fibers or combinations thereof. Among the cellulosic materials which may be used are bleached and unbleached soda, neutral sulfite, semi-chemical chemiground wood, ground wood or any combinations of these fibers. Fibers of the viscous rayon or regenerated cellulose type may also be used as well as recycled waste paper, if desired.

Any desired inert mineral fillers may be added to the pulp which contains the polysaccharide aldehydes of this invention. Such materials include clay, titanium dioxide, talc, calcium carbonate, calcium sulfate and diatomaceous earths. Other additives commonly introduced into paper may also be added to the pulp, for example dyes, pigments, sizing additives such as rosin or synthetic internal size, alum, anionic retention aids, microparticle systems, etc.

The proportion of the polysaccharide aldehyde derivative to be incorporated into the paper pulp may vary in accordance with the particular pulp involved and the properties desired. In general, it is desired to use about 0.05 to 15% and preferably about 0.1 to 5% of the derivative by weight based on the dry weight of the pulp. Within the preferred range, the precise amount which is used will depend upon type of pulp being used, the specific operating conditions, the particular end use for which the paper is intended and the particular property to be imparted.

The following examples will more fully illustrate the embodiments of this invention. In the examples, all parts and percentages are by weight and all temperatures in degrees Celsius unless otherwise noted.

EXAMPLE 1

Oxidation Procedure on Granular Starch in Aqueous Slurry

The oxidation was carried out in aqueous conditions using a 4-neck, round-bottom flask equipped with an overhead stirrer using the following procedure. The nitroxyl radical, TEMPO (0.44 g; 1 mole percent based on moles of starch ASU) and sodium bromide (2.9 g; 10 mole percent) were added to an aqueous starch slurry [50 g fluidity cationic waxy maize starch (45.5 g dry; 0.28 mole ASU) in 100 mL water] and the system was cooled to below 5° C. with an ice-water bath. The pH of the mixture was adjusted to 9.5 with sodium hydroxide (4% solution). Sodium hypochlorite (24.8 g; 4.2% solution; 5 mole %), whose pH was also adjusted to 9.5, was then introduced into the reaction mixture by dropwise addition at a rate so as to maintain the temperature of the reaction mixture <15° C. with an ice-water bath (ca. 10 minutes). The pH of the slurry was held constant at 9.5 through this addition process by the addition of 0.99 N sodium hydroxide solution (3.05 mL) using a Brinkmann Metrohm 718 STAT Titrino (pH-stat). The oxidation was essentially complete once all of the hypochlorite solution was added and the pH of the system had stabilized. A small volume of ethyl alcohol (10 mL) was then introduced at this stage to ensure that all of the hypochlorite had been consumed. Finally, the pH of the mixture was lowered to the 4.5 to 5.0 range with hydrochloric acid. The oxidized starch products were recovered by filtration and extensively washed by re-suspension in a 60/40 water/ethanol (v/v) mixture. They were then recovered by filtration, washed with water and air dried in a low humidity environment.

Determination of Aldehyde Content

Aldehyde content in oxidized starch was determined using hydroxylamine hydrochloride titration via oxime derivatization according to the following reaction and the procedure.

Starch slurry (87.5 g; 10 weight percent), oxidized as described above, was pH adjusted to 4 with aqueous HCl. To this stirred solution, a large excess of an aqueous solution of 0.3 M hydroxylamine hydrochloride solution (ca. 50 mL at pH 4) was added dropwise. During the reaction the pH of the mixture was maintained at 4 via titration with a 0.99 N NaOH solution using a pH stat. Following the completion of hydroxylamine hydrochloride addition, stirring was continued until no further reduction in pH of the solution could be detected.

The aldehyde content of the starch sample was calculated to be 2.3 mole % based on moles of starch ASU by the total consumption of NaOH (1.27 mL) using the following equation:

$$\text{mole \%-CHO} = \frac{(\text{mL of NaOH titrant} \times \text{N of NaOH})/1000}{\text{moles of starch } ASU} \times 100$$

Alternatively aldehyde content of the oxidized starch could also be estimated from the residual oxidant that was not spent in —COOH formation as described below.

Mole % —CHO=total mole % oxidant added−(mole % —COOH)×2

Determination of Carboxylic Acid Content

The carboxylic acid formed during the oxidation was calculated from the amount of NaOH titrant consumed to maintain the pH of the slurry at the reaction pH. This provides a direct measure of the carboxylic acid generated on starch which was 3.05 mL, corresponding to 1.1 mole percent based on moles of starch ASU. The following equation was used for the calculation:

$$\text{mole \%-COOH} = \frac{(\text{mL of NaOH titrant} \times \text{N of NaOH})/1000}{\text{moles of starch } ASU} \times 100$$

EXAMPLE 2

Oxidation on Dispersed (Cooked) Starch

To a 700 g cooked dispersion of 6 weight percent fluidity waxy maize starch (42 g starch or 0.26 moles of ASU) in water was added 55 mg of 4-acetamido-TEMPO (0.1 mole % based on moles of starch ASU) and 2.67 g sodium bromide (10 mole percent). The homogeneous solution was cooled to 5° C. and its pH was raised to 9.5 using aqueous sodium hydroxide. Sodium, hypochlorite (44.7 g of 13% solution; 30 mole %), whose pH was also adjusted to 9.5, was then introduced into the reaction mixture by dropwise addition at a rate so as to maintain the temperature of the reaction mixture at <15° C. with an ice-water bath (ca. 20 minutes). The pH of the solution was held constant at 9.5 throughout this addition process with 0.99 N sodium hydroxide solution (20.8 mL) using a Brinkmann Metrohm 718 STAT Titrino (pH-stat). The oxidation was essentially complete once all of the hypochlorite solution was added and the pH of the system had stabilized. A small volume of ethyl alcohol (20 mL) was then introduced at this stage to ensure that all of the hypochlorite had been consumed. Finally, the pH of the mixture was lowered to the 4.5 to 5.0 range using hydrochloric acid. At this stage 100 g of the solution was set aside for —CHO determination. The oxidized starch was then recovered by slow precipitation into ethyl alcohol (five times the volume) with rapid stirring. The precipitate was filtered off, washed with ethanol and air dried in a low humidity environment.

The —COOH content of the starch was determined from the titration during the oxidation as described in Example 1 to be 8 mole % based on moles of starch ASU. Aldehyde content in the sample was determined as described in Example 1 by hydroxylamine hydrochloride titration of 50 g aliquots of the solution set aside after the oxidation (5.5 weight percent starch) which consumed an average of 2.40 mL NaOH (0.99 N) corresponding to 14 mole % based on moles of starch ASU.

EXAMPLE 3

The procedure described in Example 1 was repeated several times under similar conditions on fluidity cationic waxy maize starch (3-chloro-2-hydroxypropyltrimethylammonium chloride modified, 5.3 mole % based on moles of starch ASU) in order to determine the effect of oxidation pH and temperature on the C-6 aldehyde (—CHO) and carboxyl (—COOH) functional content of the products. In these cases the addition rate of the NaOCl oxidant was adjusted so as to keep the reactions at prescribed temperatures using an external cooling bath. Table 1 lists the conditions and the results obtained.

TABLE 1

The effect of oxidation conditions on the C-6 aldehyde and carboxylic acid content of fluidity cationic waxy maize in the slurry state

| Oxidant | | Oxidation | | Product | |
|---|---|---|---|---|---|
| Active chlorine equivalent (g/mole)* | NaOCl (mole %)* | temperature (° C.) | Oxidation pH | —CHO content (mole %)* | —COOH content (mole %)* |
| 3.55 | 10 | 5 | 10.5 | 4.2 | 2.9 |
| 3.55 | 10 | 5 | 8.5 | 4.5 | 2.7 |
| 3.55 | 10 | 5 | 9.5 | 4.8 | 2.6 |
| 3.55 | 10 | 10 | 9.5 | 4.4 | 2.8 |
| 3.55 | 10 | 15 | 9.5 | 4.1 | 2.9 |
| 3.55 | 10 | 25 | 9.5 | 1.4 | 4.3 |

*based on moles of starch ASU

EXAMPLE 4

The procedure described in Example 1 was repeated several times on either fluidity waxy maize or fluidity cationic waxy maize granular starches in the slurry state to determine the effect of various targeted oxidation levels on C-6 aldehyde (—CHO) and carboxyl (—COOH) functional content of the products. The results are listed in Table 2.

TABLE 2

Oxidation of fluidity waxy maize and fluidity cationic waxy maize starches in the slurry and C-6 functional content of products

| Oxidant | | Starch | Product | |
|---|---|---|---|---|
| Sample # | Active chlorine equivalent (g/mole)* | NaOCl (mole %)* | Cationic content (mole %)* | —CHO content (mole %)* | —COOH content (mole %)* |
| A | 14.18 | 40 | 5.7 | 4.7 | 18.0 |
| B | 10.64 | 30 | 0 | 5.3 | 12.0 |
| C | 7.09 | 20 | 5.7 | 5.9 | 7.1 |
| D | 7.09 | 20 | 0 | 5.9 | 7.1 |
| E | 3.55 | 10 | 5.7 | 4.1 | 3.0 |
| F | 3.55 | 10 | 0 | 4.2 | 2.9 |
| G | 1.77 | 5 | 0 | 2.8 | 1.1 |
| H | 1.77 | 5 | 3.8 | 2.8 | 1.1 |

*based on moles of starch ASU

EXAMPLE 5

The procedure described in Example 2 was repeated several times under similar conditions on either fluidity waxy maize of fluidity cationic waxy maize starches in the dispersed state to determine the effect of various targeted oxidation levels on C-6 aldehyde (—CHO) and carboxyl (—COOH) functional content of the products. The results are listed in Table 3.

TABLE 3

Oxidation on fluidity waxy maize and fluidity cationic waxy maize starches in the dispersed state and the C-6 functional contents of products.

| Sample # | Active chlorine equivalent (g/mole)* | NaOCl (mole %)* | Cationic content (mole %)* | —CHO content (mole %)* | —COOH content (mole %)* |
|---|---|---|---|---|---|
| I | 14.18 | 40 | 5.7 | 12.0 | 14.0 |
| J | 10.64 | 30 | 3.8 | 12.0 | 8.8 |
| K | 7.09 | 20 | 0 | 11.0 | 4.7 |
| L | 7.09 | 20 | 3.8 | 10.0 | 4.8 |
| M | 5.32 | 15 | 5.7 | 8.7 | 3.1 |
| N | 3.55 | 10 | 5.7 | 6.9 | 1.6 |
| O | 3.55 | 10 | 3.8 | 6.9 | 1.5 |
| P | 1.77 | 5 | 3.8 | 4.0 | 0.5 |

*based on moles of starch ASU

EXAMPLE 6

Wet and dry tensile strength performance imparted by several of the cationic starch aldehyde derivatives prepared as in Examples 4 and 5 were evaluated on 18 lb/3300 sq.ft. handsheets made from 100% Northern Softwood Kraft pulp (650CSF) on a Noble and Wood Sheet Mold at pH 6–7. The addition level of the starch was 5 and 10 lb/ton. Dispersion oxidized products were added to the cellulose pulp directly after the reaction, while slurry products were cooked at 100° C. for 20 to 30 minutes at 1 weight percent and at pH 4.5 prior to addition. One inch wide strips were cut from handsheets and tested for initial wet tensile strength and dry tensile strength at the breaking point according to the TAPPI Standard Test Method T 456. The results are given in Table 4.

TABLE 4

Wet and dry tensile strength of handsheets treated with cationic starch aldehyde derivatives prepared in Examples 4 and 5.

| Sample # | Wet tensile strength at 5 lb/T (g/in) | Dry tensile strength at 5 lb/T (g/in) | Wet tensile strength at 10 lb/T (g/in) | Dry tensile strength at 10 lb/T (g/in) |
|---|---|---|---|---|
| Unoxidized cationic waxy maize | 20 | 1400 | 30 | 1600 |
| E | 153 | 1985 | 252 | 2048 |
| H | 110 | 1967 | 155 | 1884 |
| M | 304 | 1863 | 368 | 2398 |
| N | 254 | 1971 | 332 | 2142 |
| P | 183 | 2005 | 257 | 2206 |
| O | 209 | 1875 | 313 | 2249 |

EXAMPLE 7

Preparation of Pullulan Aldehyde Derivatives

The oxidation was carried out in homogeneous aqueous conditions similar to described in Example 2 as follows, The nitroxyl radical, 4-acetamido TEMPO (19 mg) and sodium bromide (1.1 g) were added to 750 g solution of 15 4.5 wt % pullulan (from Polysciences Inc.). The system was cooled to <10° C. with an ice-water bath and its pH was adjusted to 9 with aqueous sodium hydroxide. 16.2 g sodium hypochlorite (as 10.6% aqueous solution), whose pH was also adjusted to 9, was then introduced into the vigorously stirred reaction mixture dropwise at a rate so as to maintain the temperature of the reaction mixture <10° C. The pH of the solution was held constant at 9 throughout this addition process by titration with 0.49 N sodium hydroxide solution (10.7 mL) using a Brinkmann Metrohm 718 STAT Titrino (pH-stat). The oxidation was essentially complete once all of the hypochlorite solution was added and the pH of the system had stabilized (ca. 15 min). A small amount of ethyl alcohol (5 mL) was introduced at this stage to ensure that all of the hypochlorite had been consumed. Finally, the pH of the mixture was lowered to between 4.0 to 4.5 with hydrochloric acid. At this stage about 100 g of the solution was set aside for aldehyde content determination. The oxidized pullulan was then recovered by slow precipitation into ethyl alcohol. The precipitate was filtered off, washed with ethanol and air dried in a low humidity environment Aldehyde content in the sample was determined as described in Example 1 by hydroxylamine hydrochloride titration of 30 g aliquots of the solution set aside after the oxidation (1.3 g oxidized pullulan) which consumed an average of 3.8 mL NaOH (0.1 N) corresponding to 4.8 mole % based on moles of pullulan ASU. The —COOH content of the pullulan was determined from the titration during the oxidation as described in Example 1 to be 2.5 mole % based on moles of pullulan ASU.

EXAMPLE 8

Preparation of Aldehyde Derivatized Guar Gum

Using a procedure similar to described in Example 7, native guar gum (Procol U from Polypro Chemical Inc.) was oxidized in aqueous solution in the following manner. 6.4 g NaOCl (as 6.5% solution) was added slowly to a cooled and stirred solution of 0.5 g guar gum, 39 mg 4-acetamido TEMPO and 0.19 g sodium bromide in 800 mL water at pH 9.5. The solution pH was maintained at 9.5 throughout the reaction by the addition of 0.99 M NaOH solution using a Brinkman Metrohm 718 pH-stat Titrino until no further consumption took place (about 45 minutes). The reaction was then quenched with ethyl alcohol (5 mL) and worked up as described in Example 7.

Aldehyde and carboxyl content of the modified guar gum was determined by similar procedures to those described in Example 7 and was found to be 5.6 mol % and 5.6 mol % per guar ASU, respectively.

EXAMPLE 9

2-Hydroxyethyl cellulose ($M_v$~90,000 and DS 1.5 from Aldrich Chemical Co.) was also oxidized in aqueous solution under similar conditions to those described in Example 7 as follows. 26.8 g NaOCl (as 13% solution) was added slowly to a cooled and stirred solution of 28.8 g 2-hydroxyethyl cellulose, 34 mg 4-acetamido TEMPO and 1.6 g sodium bromide in 800 mL water at pH 9.5. The solution pH was maintained at 9.5 throughout the reaction by the addition of 0.99 M NaOH solution using a pH-stat until no further consumption took place. The reaction was then terminated with ethyl alcohol (5 mL) and worked up as described in Example 7.

Aldehyde and carboxyl content of the oxidized 2-hydroxyethyl cellulose was determined by similar procedures to those described in Example 7 and was found to be 3 mol % and 17 mol % per ASU respectively.

What is claimed is:

1. A method for preparing polysaccharide aldehyde derivatives having maximum effective aldehyde content comprising oxidizing polysaccharide in an aqueous solution with an oxidant having an equivalent oxidizing power of up to 14.18 g of active chlorine per mole of polysaccharide anhydrosugar unit ("ASU") and an effective mediating amount of nitroxyl radical, the reaction being carried out at a temperature of at or less than about 15° C. and a pH of from about 8.0 to 10.5, the resulting product having up to 15 mole % of C-6 aldehyde groups per mole of polysaccharide ASU and aldehyde to carboxylic acid ratios of greater than or equal to 0.5 based on moles of polysaccharide ASU of each functionality.

2. The method of claim 1 for preparing polysaccharide aldehyde derivatives wherein the polysaccharide aldehyde derivatives are starch aldehyde derivatives and the polysaccharide is starch.

3. The method of claim 1 wherein the nitroxyl radical catalyst has the formula:

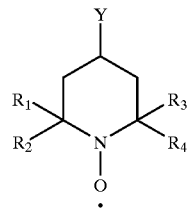

where Y is H, OH or NH—C(O)—$CH_3$ and each of the R groups represent the same or different alkyl groups of 1 to 18 carbon atoms.

4. The method of claim 3, wherein Y is selected from the group consisting of H and NH—C(O)—$CH_3$.

5. The method of claim 1 wherein the oxidant has an equivalent oxidizing power of from about 0.35 to 14.18 g of active chlorine per mole of polysaccharide ASU.

6. The method of claim 5 wherein the oxidant is sodium hypochlorite or sodium hypobromite.

7. The method of claim 1 wherein the oxidant is sodium hypochorite or sodium hypobromite and the resulting product has from about 1 to 15 mole % of aldehyde groups per mole of polysaccharide ASU and from about 0 to 20 mole % of carboxylic acid content per mole of polysaccharide ASU.

8. The method of claim 1 wherein from about 5 to 20 mole % of oxidant is used, the reaction temperature is from about 5 to 10° C., and the pH is from about 9 to 10.

9. The method of claim 1 wherein the polysaccharide is modified with a cationic group.

10. The method of claim 1 wherein the oxidation is carried out in slurry reaction.

11. The method of claim 1 wherein the oxidation is carried out in a slurry reaction, from about 5 to 20 mole % of oxidant is used, the reaction temperature is from about 5 to 10° C. and the pH is from about 9 to 10.

12. The method of claim 1 wherein the oxidation is carried out in a slurry reaction, from about 5 to 20 mole % of oxidant is used, the reaction temperature is from about 5 to 10° C., the pH is from about 9 to 10, the polysaccharide is modified with a cationic group, and the resulting product has from about 1 to 7 mole % of aldehyde groups per mole of polysaccharide ASU.

13. The method of claim 1 wherein the oxidation is carried out in a dispersed state, from about 5 to 20 mole % of oxidant is used, the reaction temperature is from about 5 to 10° C., the polysaccharide is modified with a cationic group, and the pH is from about 9 to 10.

14. The method of claim 1 wherein the oxidant is hypobromite formed in situ by the addition of sodium bromide and sodium hypochlorite.

15. The polysaccharide aldehyde derivative produced by the method of claim 1.

16. The polysaccharide aldehyde derivative of claim 15 wherein the polysaccharide aldehyde derivatives are starch aldehyde derivatives and the polysaccharide is starch.

17. The polysaccharide aldehyde derivative produced by the method of claim 5.

18. The polysaccharide aldehyde derivative of claim 17 wherein the polysaccharide aldehyde derivatives are starch aldehyde derivatives and the polysaccharide is starch.

* * * * *